United States Patent [19]

Maher

[11] 3,989,874

[45] Nov. 2, 1976

[54] RESISTANCE MATERIAL WITH COLLOIDAL ALOOH

[75] Inventor: John P. Maher, Adams, Mass.

[73] Assignee: Sprague Electric Company, North Adams, Mass.

[22] Filed: Jan. 23, 1975

[21] Appl. No.: 543,402

[52] U.S. Cl. .......... 428/432; 428/434; 428/469; 428/539; 427/101; 427/102; 427/282; 252/514; 252/518

[51] Int. Cl.$^2$ .......... B32B 15/00; B05D 5/12

[58] Field of Search .......... 252/514, 518, 514 B, 252/514 C, 514 R; 427/101, 102, 282; 428/432, 434, 469, 450, 539

[56] References Cited

UNITED STATES PATENTS

| | | | |
|---|---|---|---|
| 2,915,475 | 12/1959 | Bugosh | 252/313 |
| 3,416,960 | 12/1968 | Kelly | 252/514 |
| 3,441,516 | 4/1969 | Mulligan | 252/514 |
| 3,450,545 | 6/1969 | Ballard | 106/1 |
| 3,620,840 | 11/1971 | Schroeder | 252/514 |
| 3,655,440 | 4/1972 | Brady | 252/514 |
| 3,816,348 | 6/1974 | Popowich | 252/518 |
| 3,868,334 | 2/1975 | Van Loan | 252/518 |

*Primary Examiner*—Michael F. Esposito
*Attorney, Agent, or Firm*—Connolly and Hutz

[57] ABSTRACT

In a noble-metal containing resistor paste, there is added a quantity of colloidal aluminum oxide hydroxide (AlOOH) in order to make an upward adjustment in the TCR of the fired resistor film. The additions of AlOOH have only a small effect on the resistivity and usually causes a downward change in the resistivity value.

11 Claims, 4 Drawing Figures

RESISTANCE MATERIAL WITH COLLOIDAL ALOOH

BACKGROUND OF THE INVENTION

This invention relates to resistor inks that are normally applied as a paste coating to an insulative substrate and fired to form a resistor film. More particularly this invention relates to resistor ink additives that are intended to effect a desired modification in the temperature coefficient of resistance (TCR) of the fired resistor film.

Such resistor inks may consist of metal particles mixed with glass frit in a liquid vehicle. Others contain metal resinates, with or without glass frit, which resinates decompose at firing leaving a deposit of metal or metal oxide either in a glass matrix or as an all metal (including metal oxides) film. A survey of resinate film technology including resistor films is provided in Electrical Applications of Thin Films Produced by Metallo Organic Deposition by C. Y. Kuo, International Microelectronics Symposium 1973 — Oct. 22–24.

The electrical conductive path through such resistor films is through the metal and/or metal oxides. The temperature coefficient of resistance of these films tends to be positive when the path is predominantly metal and negative when predominantly metal oxide. It is well known to choose the ratios of particular metals and metal oxides in the film to achieve a desired TCR. Adjustments in the metal and metal oxide content of the film for purposes of adjusting the TCR are normally accompanied by corresponding changes in sheet resistivity, and current noise level. It thus becomes necessary when so adjusting the TCR to make other compensating adjustments, for example in film thickness or glass frit content. This involves an arduous and difficult procedure requiring extensive experimentation and evaluation in the formulation and processing of any new ink system for a particular application.

Many high resistivity ink systems that are suitable for making small high ohmic value (e.g. greater than 50,000 ohms per square) resistors, exhibit a negative TCR. The sheet resistivity of such resistors is particularly sensitive to additives that may be appropriate for an upward (positive) adjustment of their TCR. Most known additives have the effect of a downward (negative) adjustment of TCR as well as significantly increasing the resistivity.

It is therefore an object of this invention to provide an additive in a resistance material that adjusts the TCR in a positive direction.

It is a further object of this invention to provide an additive that adjusts the TCR in a positive direction and simultaneously either has a minor effect on the resistivity or causes the resistivity to decrease by a small amount.

It is a further object of the present invention to provide a resistor having a resistivity of greater than 50,000 ohms per square and a near zero temperature coefficient of resistance.

SUMMARY OF THE INVENTION

In a resistor paste composition, having noble metal precursors of the conductive components in the fired resistor film, there is added a quantity of colloidal aluminum oxide hydroxide (AlOOH) in order to make an upward adjustment in the temperature coefficient of resistance (TCR) of the fired resistor film. Furthermore, the additions of AlOOH have only a small effect on the resistivity and usually are seen to change resistivity to a slightly lower value. As used herein, noble metals include Ru, Rh, Pd, Ir, Pt and Au. The weight of this hydrated alumina additive that has been found effective for this purpose ranges from as low as 0.1% of the total weight of the fired resistance material.

The mechanisms by which this additive effects these changes is not known, but these surprising results strongly indicate some kind of reaction at firing between the noble metal and the additive. For example, the insulative additive would be expected to increase the sheet resistivity according to well known mixing rules, but instead even causes a decrease. It has also been found that the resistor current noise level is essentially unchanged by this additive. Furthermore, this remarkable additive must be used in colloidal form. Non-colloidal aluminum oxide hydroxide tends to lower the TCR and tends to substantially increase the sheet resistivity. Also a colloidal anhydrous alumina additive causes a greatly increased sheet resistivity and a more negative TCR. The colloidal aluminum oxide hydroxide is nearly an ideal additive for modifying in a predetermined manner the TCR associated with a standard resistor paste, without substantially altering other characteristics of the fired resistance material. The advantageous effect of this additive is realized in resistor pastes having been applied to any suitable substrate such as glass or alimina, and in pastes that may or may not contain glass or other additives such as titania or silica. It is also effective in pastes based upon noble metal resinates as well as those based upon noble metal particles. Finally, its efficacy is essentially undiminished by the presence of base metal compounds in the paste. In brief, colloidal aluminum oxide hydroxide in combination with noble metals provides the synergism that marks this invention.

DESCRIPTION OF THE PREFERRED EMBODIMENTS

Figure 1:
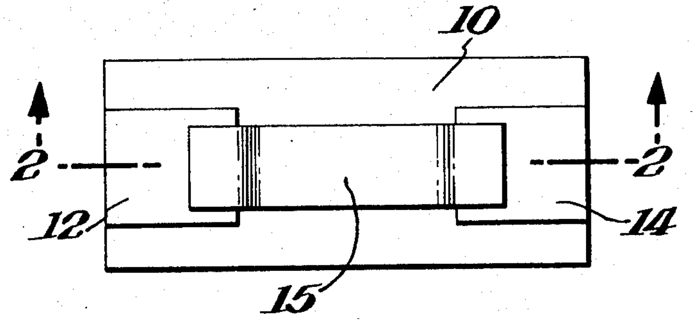
FIG. 1 shows a resistor that includes a resistance layer of this invention.
Figure 2:
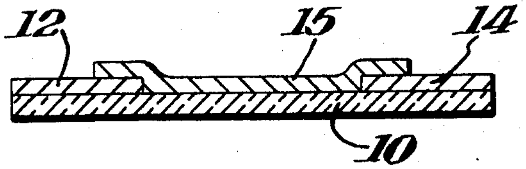
FIG. 2 shows the resistor of FIG. 1 in cross-section taken in plane 2—2.

In FIGS. 1 and 2 there is shown a top view of an alumina substrate 10 on which there are two spaced conventional electrode films 12 and 14. A layer 15 of a resistance material of this invention is shown deposited on the substrate 10 and overlapping a portion of the electrodes 12 and 14 which serve as the resistor terminations.

Figure 3:
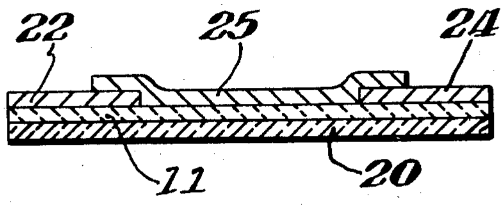
FIG. 3 shows in cross-section another resistor that includes a resistance layer of this invention on a glazed substrate.

FIG. 3 is a cross-sectional side view of another resistor similar to that shown in FIGS. 1 and 2 except that the substrate 20 is glazed having a glass film 11 bonded to a surface thereof. The terminations 22 and 24 and the resistance layer 25 are deposited on the glazed substrate surface.

A conventional resistor was made by first forming two thin conducting termination films on a glazed alumina substrate. The termination films were formed by screening Dupont platinumgold cermet ink No. 7553 onto the glazed substrate and firing at 850° C for about a half hour. The two termination films are spaced from each other by 0.150 inch.

A resistor ink was prepared by first mixing one part by weight of a gold resinate, namely resinate A-1112 made by Englehard Industries with one part by weight of an iridium resinate, namely Englehard 9600. Each of these resinates contains 15% by weight of metal. The viscosity of this mixture was reduced by the addition of $\beta$-terpineol so that it was suitable for screening. A layer of this resistor ink mixture was then screen printed in overlapping relationship with the two electrodes and fired forming a solid layer of resistance material. The total firing time was about one-half hour, the part being exposed to 750° C peak temperature for about 10 minutes.

In Table I below, data is presented that characterizes this conventional resistor which is identified as example 1. Another experimental resistor, example 2, for which data given in Table I is made in the same manner as that of example 1, except that to the resistor ink mixture there was added about 1.6% by weight a colloidal aluminum oxide hydroxide powder. A thorough and homogeneous mixture of the colloidal powder in the ink was achieved by running the mixture through a three roll mill three times. The mill had the rolls adjusted with the closest possible spacing, about 10 microns, and enough $\beta$-terpineol was added for viscosity adjustment during the milling to maintain the flow in the milling process. It has been found that without thorough mixing, as by milling, the powder tends to agglomerate and such agglomerates are believed to behave like large non-colloidal and conventional additives. The thorough dispersal is essential in the practice of this invention.

From a comparison of the data of these two examples, it is seen that according to this invention the addition of the powder in the resistance ink of example 2 had an almost imperceptible effect on the resistivity while shifting the TCR upward (more positve) by a significant amount.

It is believe that the hydrated alumina powder loses some of its water during the firing of the resistance material although this is not known. The table shows the constituents of the fired resistance material of example 2 assuming that no water was lost from the hydrated powder in which case the fired resistance material would contain 10.7% aluminum oxide hydroxide and 89.3% metal. If all the water had been driven off then the resistance material would contain 9.1% anhydrous alumina and 90.9% metal. The truth is believed to lie somewhere inbetween.

In a third example again typifying a conventional resistor, a resistor ink is prepared by mixing an ink having seven parts by weight of a finely divided ruthenium powder with 93 parts of a lead borosilicate glass frit. To these components was added an organic vehicle to form a resistor ink that was screened onto an electroded alumina substrate in a similar manner as described in examples 1 and 2. The conducting component of this fired resistance material consists of ruthenium oxide. The substrate in this third example was a bare unglazed substrate. The resistance material was fired as in examples 1 and 2.

In a fourth example according to this invention, a resistor was made as described in example 3 except that to the resistor ink mixture of example 3 that contained about 75% solids there was added 15% by weight of a colloidal aluminum oxide hydroxide powder. After the resistance material is fired it contains (as can be determined from this above data) 5.8% Ru, 77.5% glass and 16.7% hydrated alumina.

Comparing the data given in Table I for examples 3 and 4 it is seen that no perceptible change in resistivity occurred while the TCR was caused to become more positive by the addition of the colloidal hydrated alumina powder to the resistance material of example 4.

In a fifth example, a resistor ink mixture consisted of glass frit and resinate that included 4.1% Pt, 8.5% Au, 1.0% Ir and 0.4% Rh by weight. Also included in the resinate were several base metal oxides that upon firing were converted to base metal oxide fluxes which ultimately reacted with and became a part of the glass system in the fired resistance material. The glass to resinate ratio was adjusted so that the fired resistance material contained 93.4% glass and 6.6% metal. Thus the precious metals Pt, Au, Ir and Rh were represented as 1.91, 4.0, 0.5, and 0.2 weight percent, respectively, of the fired resistance material. The resistance material of example 5 serves as a conventional reference material for comparison with the resistance materials of examples 6, 7, 8 and 9 below.

A resistance material of this invention designated example 6 is the same as that of example 5 except that it contains an additional 6% by weight of colloidal aluminum oxide hydroxide. Thus the weight percent of the components making up the fired resistor material are 1.8 Pt, 3.8 Au, 0.5 Ir, 0.2 Rh, 88.1 glass and 5.7 AlOOH. From the data in Table I, it is seen that the resistivity is decreased and the TCC becomes more positive as a result of this powder additive.

In example 7 again according to this invention the resistance material contains a larger quantity of colloidal aluminum oxide hydroxide, namely 12% by weight and the resistivity decreases further while the TCC becomes even more positive.

The experimental resistance material of example 8 contains 6% of a non-colloidal aluminum oxide hydroxide powder having particle sizes ranging from about 2 to 60 microns. The resistivity is higher compared with example 5 and the TCR has become more negative as is usually the case when inorganic insulative powders are added to a resistor ink.

The resistance material of example 9 illustrates the effect of adding colloidal anhydrous alumina. This anhydrous additive was a colloidal powder having an average particle size of 0.03 microns. The first screened and fired layer of this material exhibited an extremely high resistance. In a subsequent experiment two layers were screened and fired together and the data for the composite layer resistor is given in Table I. Again the more conventional and expected result is obtained as seen in Table I, namely that the resistivity increases approximately according to well known mixing rules and the TCR becomes more negative in comparison with example 5.

TABLE I

| Example | Composition of fired resistance material | Resistivity (ohms/sq.) | TCR (ppm/° C) |
|---|---|---|---|
| 1 | 50 % Ir and 50 % Au. | 56 | +573 |
| 2 | 45.6 % Ir, 45.6 % Au and 10.7 % AlOOH. | 55 | +670 |
| 3 | 7 % Ru and 93 % glass. | 2.5K | +210 |
| 4 | 5.8 % Ru, 77.5 % glass and 16.7 % AlOOH. | 2.5K | +260 |
| 5 | 1.9 % Pt, 4.0 % Au, 0.5 % Ir, 0.2 % Rh, and 93.4 % glass. | 345K | −399 |
| 6 | Same as Ex.5 with 6 % colloidal AlOOH added. | 229K | − 88 |
| 7 | Same as Ex.5 with 12 % colloidal AlOOH added. | 208K | + 49 |
| 8 | Same as Ex.5 with 6 % non-colloidal AlOOH added. | 400K | −500 |
| 9 | Same as Ex.5 with 9 % colloidal anhydrous $Al_2O_3$ added. | 750K | −600 |

It is clear from the data of examples 5, 6, 7, 8 and 9 that to cause an increase in the TCR it is essential that the alumina oxide powder be colloidal and that it be hydrated.

In making the resistors of the examples listed in Table I, excepting those of examples 3 and 4, a 306 mesh nylon monofilament screen was used. The resistor layers of examples 3, 4 and 9 were made by screen printing two overlapping films of ink through a 200 mesh stainless steel screen. All resistors had the dimensions 0.05 inch wide and 0.150 inch wide and 0.150 inch long between the electrode terminations. Although the resistors of the above described examples were fired within the range of from 750° C to 845° C, in general, resinate derived resistors of this invention may be fired from about 600° to 870° C.

The colloidal aluminum oxide hydroxide powder that was included in the resistance materials of examples 2, 4, 6, 7 and 11, exemplifying materials of this invention, was analyzed by a standard transmission electron diffraction method at 100 Kev. Some of the powder was sprinkled on a carbon film and examined by electron diffraction. The microscopy specimens were also examined by selected area diffraction to determine the orientation of the fine particles. The structure is found to be a good match to $\gamma$ - ALOOH (Boehmite) or $\gamma$ - $Al_2O_3.H_2O$. This gamma phase aluminum oxide hydroxide, or alumina monohydrate, is described by card No. 1375 of The Joint Committee on Powder Diffraction Standards, 1971. However, all lattice constants of the colloidal powder are on the order of 2% larger than those determined for the natural mineral, boehmite, which discrepancy may be explained by the extremely small particle size of the specimen.

The powder was further analyzed by standard electron microscopy at 100 Kev. The powder was dispersed in nitrocellulose and drawn down into a thin film. The very thin film containing the particles was stabilized with evaporated carbon and examined. The smallest particles are 100 A to 200 A in diameter. When dispersed, there appear no particles large enough to be resolved by an optical microscope at 1000 magnification. It is concluded that there were no particles having any dimension greater than 0.5 micron and the average size of the longest particle dimension was well below 0.05 microns.

The maximum quantity of colloidal AlOOH that can be included in a practical resistance material is a function of many factors relating to the character of the starting resistor composition; such as the amount of included glass, the thickness of the resistance layer and the size and material of the conducting particles. The AlOOH may be advantageously added until, for a given parent resistor material, the resistivity (usually abruptly) becomes very large and essentially open. For example in experimental resistors having a starting material essentially the same as that in example 5, with no AlOOH, had a resistivity of 526Kohms/square and a TCR of −507 ppm; with 5.4% AlOOH, 129Kohms/square and +68 ppm;with 10.8% AlOOH, 210Kohms/square and +83 ppm; with 13.5% AlOOH, 2.9 megohms/square and −310 ppm; and with 16.2% AlOOH, 17 megohms/square. Even with as much as 13.5% AlOOH this resistor material is useful and has a TCR nearer zero than the parent material. However with 16.2% AlOOH it is for most practical purposes open and useless. The above example merely illustrates how, for a particular material, the TCR modifying properties of the additive remain effective until so much is added that it becomes open. The systems of examples 1 and 3 would be expected to become open and useless only after much larger quantities of AlOOH were added.

Figure 4:
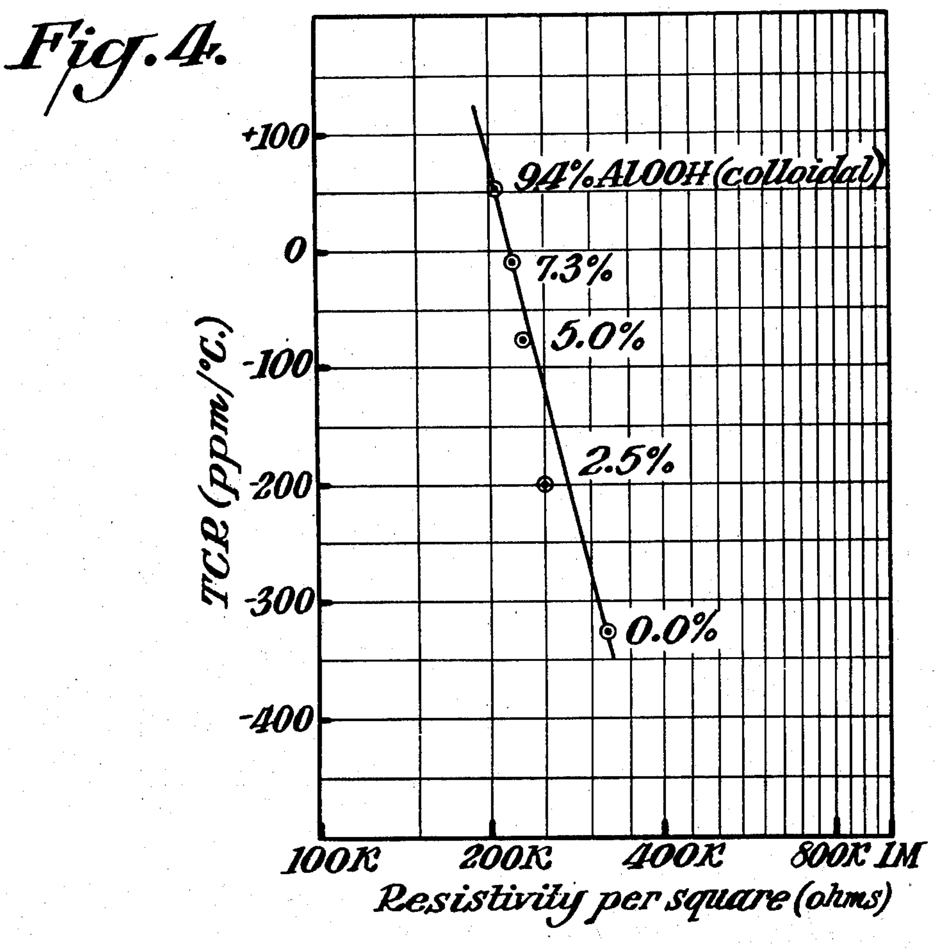
FIG. 4 shows a graph of TCR and resistivity of resistance materials of this invention as a function of their content by weight of colloidal aluminum oxide hydroxide.

In another set of five sample high resistivity resistors that included essentially the same resistor ink components and were prepared by the same procedure described above for the resistor of example 5, each sample resistor contained a different amount of colloidal alumina having been introduced as aluminum oxide hydroxide powder. Each data point in FIG. 4 represents one of these experimental samples. The equivalent amount of colloidal aluminum oxide hydroxide contained in each resistance material is shown by the corresponding data point and is given in weight percent of the total weight of the resistance material. A straight line has been fitted to the data points. From this graph it can be determined that a zero TCR can be achieved by including about 7.5% AlOOH (equivalent to 3% alumina) in the resistance material. It can also be seen that in this material the addition of only 0.1% of colloidal AlOOH (which is equivalent to 0.04% alumina) provides a +5 ppm change in the TCR which for some practical purposes would have engineering significance. It can also be seen that when the amount of the alumina powder additive is doubled anywhere along this line that the TCR is made more positive by about 120 ppm. Also, doubling the amount of additive causes the sheet resistivity to decrease by only 8.5%.

These are surprising results when viewed in the context of the known art. Almost any insulative powder additive when doubled, especially in a high resistivity material is heretofore known to cause a substantial increase in the sheet resistivity, often one or more orders of magnitude, while the TCR tends to become more negative.

The colloidal aluminum oxide hydroxide powder additive of this invention advantageously tends to have the opposite effect. Although the mechanisms by which this is accomplished are not fully understood, it is clear from the circumstantial evidence presented herein that a reaction occurs at firing between the colloidal AlOOH additive and the noble metal. This reaction occurs regardless of the means by which the conducting noble metal or noble metal oxide component is formed in the resistance material, regardless of the nature of the underlying substrate and regardless of the inclusion within the resistance material of other components such as glass and base metal fluxes.

What is claimed is:

1. In a resistance material having an electrically conductive component selected from a noble metal and a noble metal oxide, the improvement comprising the addition therein of colloidal alumina particles having been introduced in the form of colloidal aluminum oxide hydroxide particles, and being uniformly dispersed in said material for the purpose of making the temperature coefficient of resistance more positive, the weight percent of said alumina particles that are present in said resistance material being no less than 0.04% and no more than that required to cause the sheet resistivity of said resistance material to exceed about 17 megohms per square.

2. The resistance material of claim 1 additionally having a matrix of glass therein.

3. The resistance material of claim 1 wherein said aluminum oxide hydroxide is boehmite.

4. The resistance material of claim 1 additionally having a suppporting ceramic substrate, said resistance material being a layer that is bonded to said substrate.

5. The resistance material of claim 4 wherein said substrate is glazed.

6. The resistance material of claim 1 wherein the average of the largest dimensions of said aluminum oxide hydroxide particles is less than 0.05 microns.

7. In a method for making a layer of resistance material including preparing a resistor ink containing an electrically conductive precursor component selected from a noble metal and a noble metal oxide, applying a layer of said ink to a substrate and firing said ink; the improvement comprising uniformly dispersing in said ink colloidal particles of aluminum oxide hydroxide for the purpose of making the temperature coefficient of resistance of said fired resistance material more positive, the amount of said aluminum oxide hydroxide in weight percent of the combined weight of said alumina and said metal in said ink, being no less than 0.1% and no more than that required to cause the sheet resistivity of said fired resistance material to exceed about 17 megohms per square.

8. The method of claim 7 additionally comprising mixing into said ink a quantity of glass frit.

9. The method of claim 7 wherein said applying of said layer to said substrate is accomplished by screen printing.

10. The method of claim 7 wherein said conductive precursor component in said ink consists of particles of said noble metal.

11. The method of claim 7 wherein said conductive precursor component in said ink consists of a noble metal resinate.

* * * * *